United States Patent [19]

Bernatt

[11] 4,352,437

[45] Oct. 5, 1982

[54] COMBINED PRESSURE RELIEF AND INDICATOR MECHANISM

[75] Inventor: Joseph Bernatt, Casa Grande, Ariz.

[73] Assignee: S&C Electric Company, Chicago, Ill.

[21] Appl. No.: 951,686

[22] Filed: Oct. 16, 1978

[51] Int. Cl.³ .............................................. B65D 25/00
[52] U.S. Cl. .................................. 220/89 A; 137/68 R
[58] Field of Search ............. 220/89 A, 367; 200/306, 200/61.08; 137/68 R, 102

[56] References Cited

U.S. PATENT DOCUMENTS

| | | | |
|---|---|---|---|
| 2,230,961 | 2/1941 | Lewis | 220/89 A X |
| 2,378,135 | 6/1945 | Evans | 220/89 A X |
| 2,505,456 | 4/1950 | Beecher | 137/68 R X |
| 3,109,555 | 11/1963 | Samans | 220/89 A |
| 3,229,848 | 1/1966 | Chabala | 220/89 A |
| 3,845,878 | 11/1974 | Carlson | 137/68 R X |
| 4,085,764 | 4/1978 | Raidl, Jr. | 220/89 A X |
| 4,134,515 | 1/1979 | Hills et al. | 220/219 |

Primary Examiner—Steven M. Pollard
Attorney, Agent, or Firm—John D. Kaufmann

[57] ABSTRACT

A combined pressure relief and pressure indicating mechanism includes a diaphragm closing a vent in a housing. The diaphragm is punctured if an excessive overpressure occurs in the housing to relieve same. A movable indicator is held from moving by the diaphragm as long as the housing pressure exceeds a minimum value. If the housing pressure falls below this value the indicator moves, its movement giving a visual indication of an underpressure.

20 Claims, 3 Drawing Figures

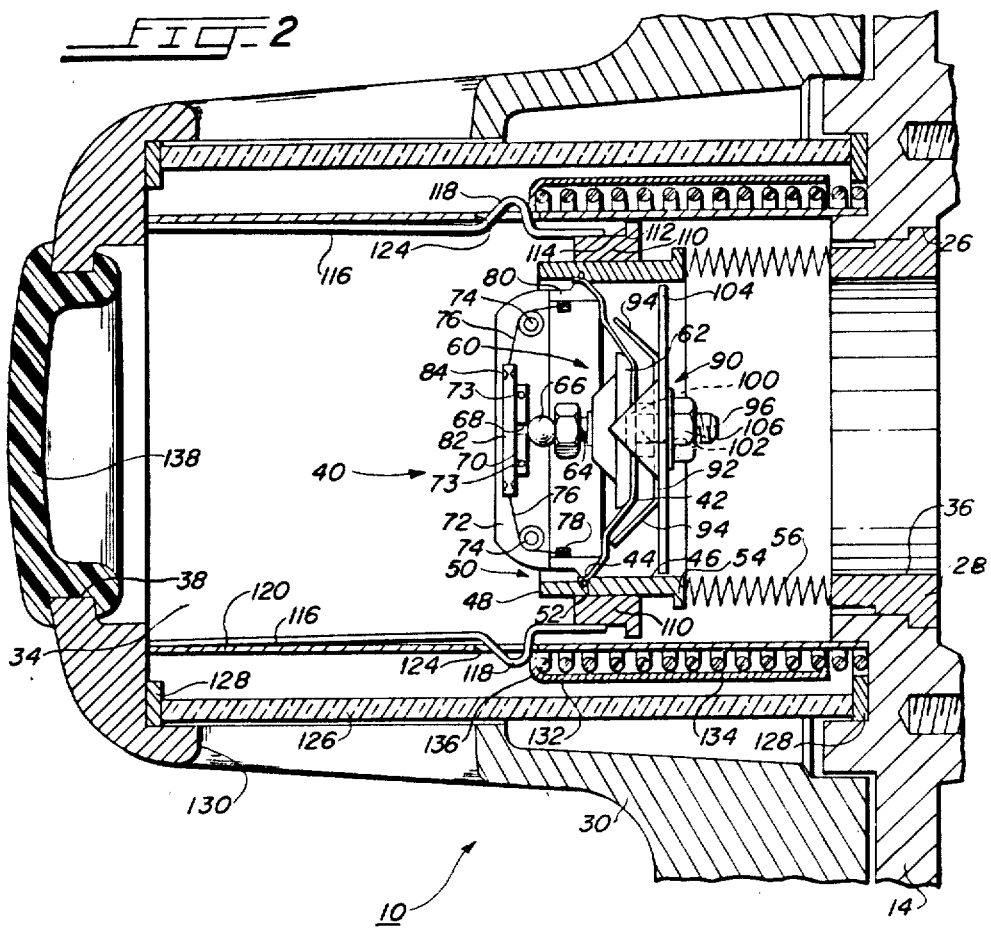

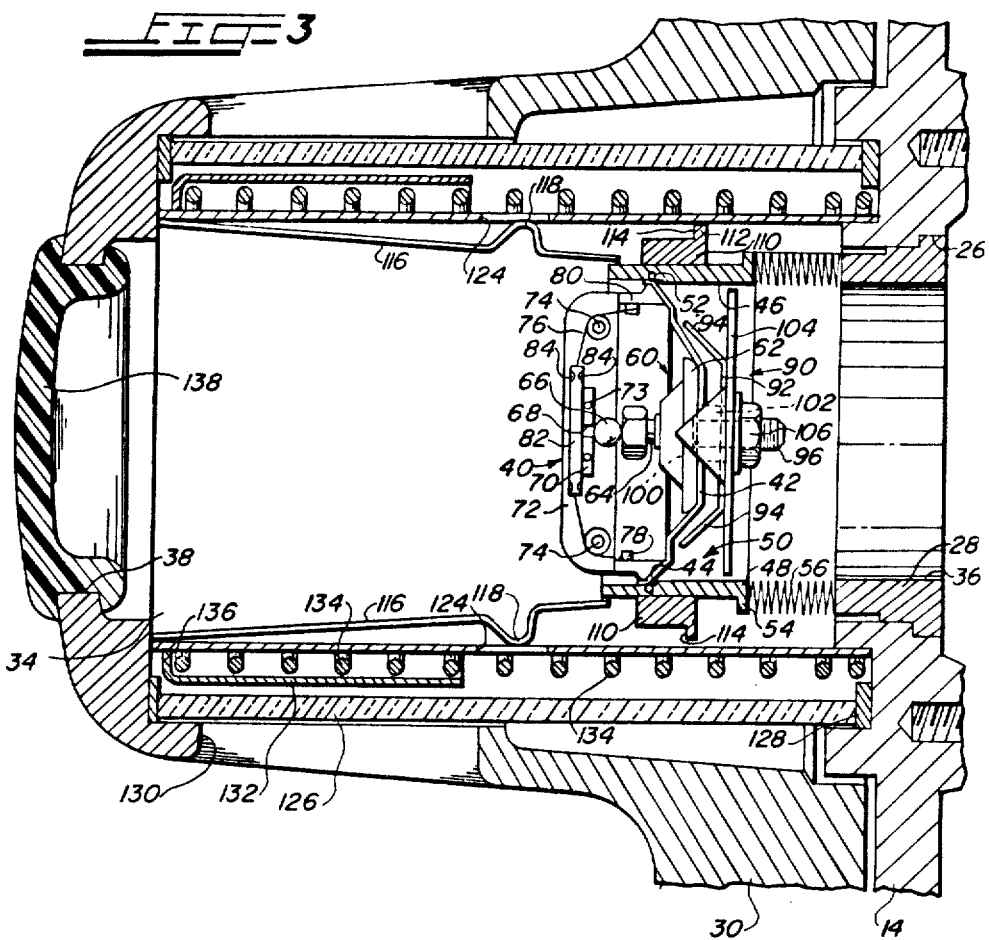

COMBINED PRESSURE RELIEF AND INDICATOR MECHANISM

BACKGROUND OF THE INVENTION

1. Field of the Invention

This invention relates to a combined pressure relief and pressure indicating mechanism, and more particularly, to such a mechanism usable with a sealed housing filled with a fluid at super-atmospheric pressure. Specifically, the present invention relates to a combined pressure relief and visible pressure indicating mechanism for the housing of a high-voltage, circuit interrupting device which is filled with a dielectric arc-extinguishing gas at super-atmospheric pressure.

2. Background of the Invention

Many types of high-voltage circuit interrupting devices include porcelain housings containing an arc-extinguishing fluid, often a gas, at super-atmospheric pressure; i.e., a pressure greater than one atmosphere. The circuit is interrupted by separating normally engaged contacts within the housing, while an arc or arcs are drawn therebetween. The arcs are subsequently extinguished by elongation thereof and the action of the gas. Under certain conditions, increased gas pressure within the housing may fracture the housing, unless provision is made for rapidly relieving the excess pressure. Moreover, under certain other conditions, the pressure of the gas within the housing may drop to a level at which the ability of the interrupting device to extinguish the arcs is severely reduced or eliminated. Examples of circuit interrupting devices which include porcelain housings containing arc-extinguishing gases under super-atmospheric pressure are found in a co-pending, commonly-assigned U.S. patent application Ser. No. 930,774, filed Aug. 3, 1978 in the names of Opfer and Vojta, and in the following commonly-assigned U.S. Pat. Nos. 3,039,481; 3,077,527; 3,163,736; 3,229,848; 3,508,022; and 3,769,477.

The above-referred to U.S. Pat. No. 3,229,848 also discloses and claims a pressure relief means which provides for the rapid venting of the procelain housing of the circuit interrupting device. The pressure relief means therein disclosed and claimed operates very well and has found wide use. The interrupting device of such patent, however, employs a separate, low pressure indicating means and as a consequence, both a pressure relief means and a low pressure indicating means must be provided therefor. It would be convenient, efficient and economical to provide a combined pressure relief and pressure indicating mechanism which performs both functions with a single unit and which is reliable and not subject to deterioration.

SUMMARY OF THE INVENTION

A combined pressure relief and pressure indicating mechanism according to the principles of the present invention constitutes an improvement, and a modification, of the pressure relief means disclosed and claimed in commonly-assigned U.S. Pat. No. 3,229,848.

The pressure relief and pressure indicating mechanism of the present invention is intended for use with a sealed housing filled with a fluid at super-atmospheric pressure. The housing may be a porcelain housing of a high-voltage circuit interrupting device and the fluid may be a dielectric, arc-extinguishing gas, such as $SF_6$.

The mechanism includes a rupturable diaphragm facility which normally closes a vent. The rupturable diaphragm is normally maintained in a first configuration as long as the fluid pressure is below a first value. Preferably, the first configuration is such that the inside of the diaphragm facility (to which is applied the pressure of the fluid) is convex, while the outside of the diaphragm facility (to which is applied atmospheric pressure) is concave. The diaphragm moves out of the first configuration into a second configuration, preferably by eversion, when the fluid pressure exceeds the first value. Puncturing apparatus is so arranged with respect to the diaphragm facility that it punctures the diaphragm in response to movement of the diaphragm out of the first configuration. The mechanism also includes a visible, but normally unobservable, movable indicator which is biased toward an observable position. A holder or frame included with the diaphragm facility normally maintains the indicator in its normal unobservable position as long as the fluid pressure is greater than a second value which second value is less than the first value. The holder releases the indicator to move to an observable position in response to the fluid pressure falling below the second value.

In preferred embodiments, the puncturing apparatus is connected to the diaphragm facility so that when the diaphragm facility is in its first configuration, the puncturing apparatus is held out of contact therewith, but during eversion thereof, the diaphragm facility and the puncturing apparatus move together bringing a cutting section into puncturing contact with the diaphragm facility.

BRIEF DESCRIPTION OF THE DRAWING

FIG. 2 is an enlargement of a portion of FIG. 1 showing in greater detail the mechanism of FIG. 1 including apparatus for normally maintaining a diaphragm facility in a predetermined configuration in accordance with the principles of the present invention; and FIG. 3 is an enlargement of a portion of FIG. 1 similar to FIG. 2, but following operation of the mechanism to indicate an underpressure.

DETAILED DESCRIPTION OF THE INVENTION

Figure 1:
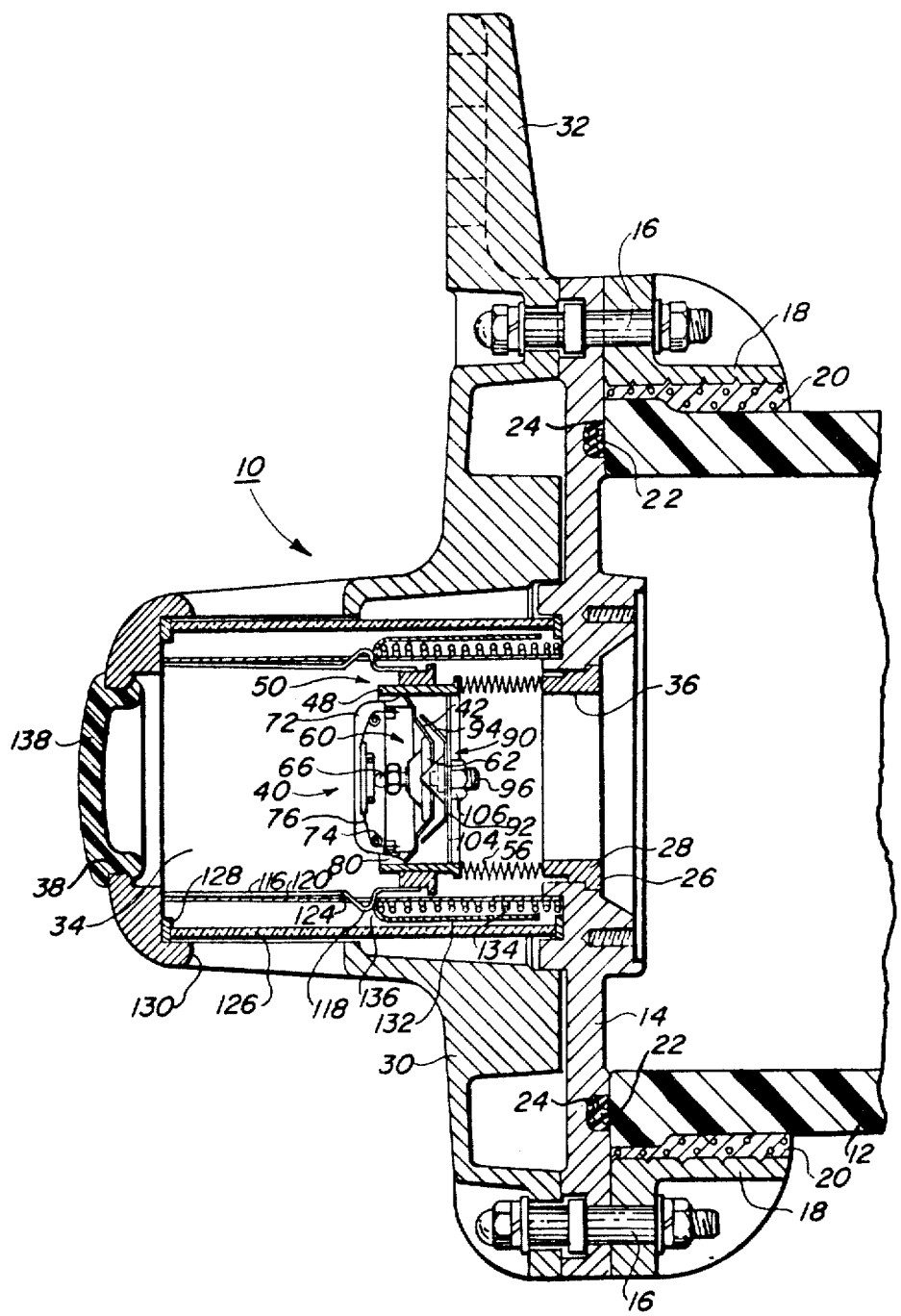
FIG. 1 is a side elevation, partially sectioned view of the combined pressure relief and pressure indicating mechanism according to the principles of the present invention.

A combined pressure relief and pressure indicating mechanism 10 according to the principles of the present invention is shown in FIG. 1 attached to one end of a housing 12, only a portion of which is shown. The housing 12 may typically enclose various elements of a high-voltage circuit interrupting device (not shown) or may be used with any other type of device which utilizes or is expected to contain fluid under pressure. The details of the housing 12 and of the elements contained therewithin, as well as the details of other structures associated with the housing 12, are more completely described in co-pending, commonly-assigned U.S. patent application, Ser. No. 930,774, filed Aug. 3, 1978, in the name of Opfer and Vojta; and in commonly-assigned U.S. Pat. No. 3,229,848 to Chabala.

In the event the housing 12 is utilized with a circuit interrupting device, the housing 12 is preferably made of porcelain or a similar insulative material. The housing 12 includes an end plate 14, closing the otherwise open end thereof, which may be attached to the housing 12 by any convenient arrangement. In the depicted embodiment, the end plate 14 is attached by bolts 16 or the like to a flanged ring 18 attached to an end of the housing 12 by a quantity of Portland cement 20 or other suitable adhesive. Positive sealing between the end plate 14 and the housing 12 may be assured by a circular gasket or seal 22 contained in a channel 24 in the end plate 14 and sealed against the transverse end surface of the housing 12.

Centrally located in the end plate 14 is a vent 26 which communicates with the interior of the housing 12 and through which the pressure of any gas or fluid within the housing 12 is communicated. Where the housing 12 is used with a high-voltage circuit interrupting device, the gas contained within the housing 12 is a dielectric, arc-extinguishing gas such as sulfurhexafluoride ($SF_6$). The vent 26 may contain a coaxial insert 28 made of copper, brass or the like to which soldering or brazing may be easily effected.

Attached to the end plate 14, for example, by the bolts 16, is a bell housing 30 for the mechanism 10 of the present invention. The housing 30 may be made of metal, and may include an integral terminal pad 32 for electrical connection of the circuit interrupting device to an electric circuit. The bell housing 30 has a hollow interior 34 within which are contained the various elements of the mechanism 10. The hollow interior 34 communicates with the vent 26, and more specifically, with a central aperture 36 formed in the insert 28. The end of the bell housing 30 remote from the end plate 14 includes a port 38 generally coaxial with the hollow interior 34, the vent 26 and the central aperture 36.

A rupturable diaphragm facility 40 which is similar to the pressure relief means depicted in commonly-assigned U.S. Pat. No. 3,229,848 is contained within the hollow interior 34 of the bell housing 30. The rupturable diaphragm facility 40 is more completely described in the above-referred to patent and is only generally described here.

Referring now also to FIG. 2, the facility 40 includes a rupturable diaphragm 42 having a generally frusto-conical configuration with the convex side normally facing toward the interior of the housing 12. The rupturable diaphragm is preferably formed from a disk of soft annealed sheet copper having a thickness of the order of 0.008 inch. The diaphragm 42 is attached as by soldering or brazing to an internal shoulder 44 formed in one end of a central aperture 46 of a cylindrical member 48 which comprises a portion of an apertured frame 50, to be described in greater detail below. The soldering or brazing between the diaphragm 42 and the cylindrical member 48 is indicated at 52.

Attached to a flange 54 formed at the other end of the cylindrical member 48 is one end of a flexible, metallic bellows 56. The bellows is attached to the flange 54 by soldering or brazing and is thereby sealed to the cylindrical member 48. The other end of the bellows 56 is attached and sealed, as by brazing or soldering, to the free end of the insert 28 or, if such insert 28 is not used, to the end plate 14 surrounding the vent 26. This attachment of the bellows 56 between the cylindrical member 48 and the insert 28 (or the end plate 14) completely seals the vent 26 and normally prevents the escape of gas or fluid from the housing 12 as long as the rupturable diaphragm 42 remains intact.

The other side of the diaphragm 42 which in the normal configuration thereof assumes a concave shape is exposed to atmospheric pressure within the hollow interior 34 of the bell housing 30. It is here noted that the bellows 56 is not present in the pressure relief means of U.S. Pat. No. 3,299,848, a solid non-flexible tube being shown therein.

The metallic bellows 56 permits free movement of the cylindrical member 48, with the rupturable diaphragm 42 soldered thereto, toward and away from the vent 26. Specifically, given a predetermined spring rate for the bellows 56, the cylindrical member 48 and the bellows 56 may be made to remain stationary with a given pressure within the housing 12. Should the pressure within the housing 12 exceed this given pressure, the increased gas pressure will expand the bellows 56 causing movement of the cylindrical member 48 away from the vent 26. Should the pressure within the housing 12 drop below this given pressure, the spring rate of the bellows 56 will cause inward movement thereof and of the cylindrical member 48 toward the vent 26.

A facility 60 is provided for maintaining the rupturable diaphragm 42 in its first configuration as depicted in FIGS. 1 and 2 and for permitting the diaphragm 42 to assume a second, everted configuration in the event that the pressure within the housing 12 exceeds some first predetermined value.

The rupturable diaphragm 42 is held in its normal, frust-conical configuration as depicted in FIG. 1 by the facility which includes a pressure plate 62 which acts against the diaphragm 42 from the concave outside thereof. The pressure plate 62 is threaded onto a jack screw 64, partially in an indentation at the other end of which is held a stainless steel ball 66. The ball 66 is in turn held in a central opening 68 of an adjusting plate 70 which is positioned between and held by side plates 72 (only one is shown). Ears of tabs 73 on the adjusting plates 70 held in slightly elongated slots (not shown) in the side plates 72 permit a limited amount of lost motion of the adjusting plate 70 with respect to the side plates 72 in a direction along the major axis of the vent 26. The side plates 72 are held in a rigid spaced-apart relation by transversely extending tie pins 74.

A strain wire 76, preferably formed of a corrosion-resistant alloy such as stainless steel is looped over anchors 78 attached to a ring member 80 which traps the outer periphery of the rupturable diaphragm 42 between itself and the shoulder 44 of the cylindrical member 48. From the anchors 78, the strain wire 76 passes around the tie pins 74, the loose ends thereof being located within and held by a tubular connecting member 82 which is deformed or crimped, as at 84, to hold the ends of the strain wire 76 therein. In the preferred embodiment depicted, the mechanism 10 is intended to relieve pressure within the housing 12 in excess of about 5.5–6 atmospheres absolute. To this end, the strain wire 76 has a diameter of about 0.015 inch. Different diameters of the strain wire 76 will be required at different pressures. The outer edges of the side plates 72 are held against the ring member 80 by tension in the strain wire 76 and are free to move away from the ring member 80 should the strain wire be broken. Rotation of the jack screw 64 may be effected to facilitate installation and tensioning the strain wire 76. Tensioning of the strain wire 76 applies a compressive force to the jack screw 64 which is in turn applied through the pressure plate 62 to the diaphragm 42 thus maintaining the diaphragm in its first configuration as depicted in FIGS. 1 and 2.

A puncturing facility 90 includes a plate 92 preferably formed of cold-rolled sheet steel, the laterally extending corners 94 of which are formed toward the diaphragm 42 and define cutting sections. In the first configuration of the diaphragm 42 the corners 94 generally conform to this configuration and are maintained out of contact with the diaphragm 42 by a bolt 96 which passes through the plate 92 and which has its head 100 affixed, as by brazing, to the inner side of the diaphragm 42. A spacer 102 is positioned between the bolt head 100 and the plate 92 to maintain the corners 94 out of contact with the diaphragm 42 under normal conditions. A piston 104 made of a circular metal plate is positioned about the bolt 96 above the plate 92. The piston 104 and the plate 92 are firmly held in position against the spacer 102 by a nut 106 which is threaded onto the bolt 96. The size of the piston 104 is such that the aperture 46 of the cylindrical member 48 is nearly filled thereby.

The operation of this portion of the mechanism 10 in accordance with the present invention for relieving overpressures within the housing 12 is now generally described. This operation is more completely described in the above-referred to commonly-assigned U.S. Pat. No. 3,229,848.

Under normal conditions, the fluid pressure within the housing 12 on the left side of the piston 104 is equalized with the pressure within the housing 12. This pressure acts against the rupturable diaphragm 42 in its first configuration as depicted in FIG. 1 with a force that is equal to the unit pressure times the cross sectional area of the aperture 46 through the cylindrical member 48. In part, this force is resisted by that portion of the rupturable diaphragm 42 adjacent the shoulder 44 on the cylindrical member 48 and the ring member 80. The major portion of this force, however, is resisted by the strain wire 76. The strain wire 76 preferably has an elongation of approximately 3%. At a selected fluid pressure within the housing 12, sufficient force applied to the rupturable diaphragm 42 and transmitted by the elements 62,64,66 and 70 breaks or severs the strain wire 76. Breakage of the strain wire 76 permits movement of the side plates 72, the adjusting plate 70, the ball 66, the jack screw 64, the pressure plate 62, and the diaphragm 42. As a consequence, the diaphragm 42 everts with a snap action. Because the head 100 of the bolt 96 is secured to the diaphragm 42, during such eversion of the diaphragm 42, the corners 94 on the plate 92 are moved into cutting contact with the diaphragm 42. Such cutting contact causes the corners 94 to pierce or cut the diaphragm 42 forming four triangular holes therewithin. As soon as the fluid or gas through the housing 12 begins to flow through these four openings, an increasing pressure differential appears on the opposite sides of the piston 104. The result of this differential is that a greater pressure is applied to the inner side of the piston 104, further driving the plate 92 and the corners 94 outwardly. Thus, the piston 104 ensures that following the cutting of the diaphragm 42, the various loose elements are rapidly driven into and through the port 38 formed in the bell housing 30. The fluid from the housing 12 is thus free to flow through the vent 26 (or through the central aperture 36) and from there through the hollow interior 34 of the housing 30 and through the port 38.

The piston 104 is normally positioned between the rupturable diaphragm 42 and the interior of the housing 12, which in the preferred embodiment may contain various elements of a circuit interrupting device. In this position, the piston 104 shields the rupturable diaphragm 42 from the head of any arcs within the housing 12 during normal operation of the interrupting device. This is desirable because the diaphragm 42 is formed of a relatively thin material and could be adversely affected if it were directly subjected to the heat of the arc.

Except for the presence of the bellows 56, and the fact that it and the cylindrical member 48 are both movable toward and away from the vent 26, all of the above-described elements generally cooperate to form a pressure relieve mechanism similar to that described in the above-noted, commonly-assigned U.S. Pat. No. 3,229,848. The pressure indicating function served by the mechanism 10 of the present invention includes such bellows 56 and the fact that the cylindrical member 48 is movable.

The cylindrical member 48 includes on its outer periphery an enlargement 110 which may comprise a separate ring surrounding the member 48 or an integral surface feature thereof. The enlargement 110 includes a flange 112 which defines a shoulder 114 at its junction with the enlargement 110. The cylindrical member 48, the enlargement 110, the flange 112, and the shoulder 114 are all so related to the hollow interior 34 of the bell housing 30 that movement thereof due to flexing of the bellows 56 is generally axial of the vent 26, the central aperture 36, and the hollow interior 34.

Attached to the lefthand end of the bell housing 30 within the hollow interior 34 are one or mre elongaged leaf springs 116. The leaf springs 116 are firmly attached at one end by any convenient method to the interior of the housing 30, their opposite ends being free to move or flex inwardly or outwardly transversely of the axis of the hollow interior 34. Near the movable end of the leaf spring 116 is included a deformed portion or finger 118. The movable end of the leaf spring 116 normally rides against and permits sliding movement therepast of the enlargement 110 as shown. The ends of the leaf springs 116 limit leftward movement of the cylindrical member 48 away from the vent 26 by engagement between such ends and the shoulder 114. Inward movement of the cylindrical member 48 under the influence of the bellows 56 as above-described is neither limited nor prevented by the ends of the leaf springs 116.

Positioned within the hollow interior 34 of the bell housing 30 is a thin-walled cylinder or sleeve 120 which is retained between the inner left end of the bell housing 30 and the end plate 14 respectively. The cylinder 120 includes holes or apertures 124 through which the fingers 118 are free to move back and forth upon flexure of the leaf springs 116. Retained between gaskets 128 is a transparent cylinder 126 through which the outer surface of the cylinder 120 is visible from the outside of the bell housing 30 through a viewing port 130 formed therethrough.

Between the coaxial inner cylinder 120 and the transparent cylinder 126 is a cylindrical, coaxial indicator 132 which is movable parallel to the cylinders 120 and 126. A normally-compressed compression spring 134, acting between a lip 136 formed on the indicator 132 and the end plate 14, biases the indicator 132 for leftward movement to a position where it may be viewed through the viewing port 130 and the transparent cylinder 126. To aid in such viewing, some or all of the indicator 132 may be painted or coated with a vivid color such as red or orange, while the cylinder 120 may be painted a contrasting color.

In the normal position of the indicator 132, its movement to an observable position is prevented by the fingers 118 protruding through the holes 124. Specifically, in the normal position of the indicator 132, the fingers 118 are positioned in the path of movement of the indicator 132 by the engagement of the end of the leaf springs 116 with the outside surface of the enlargement 110. The leaf springs 116 are biased so that they tend to move inwardly toward the axis of the hollow interior 34, but are prevented therefrom by their engagement with the enlargement 110. Because of the interference by the fingers 118 with the lip 136, the indicator 132 is held against movement to an observable position.

Referring now to FIG. 3, should an underpressure of a sufficient magnitude within the housing 12 occur, the spring constant of the bellows 56 moves the cylindrical member 48 inwardly. Such inward movement of the cylindrical member 48 continues until the ends of the leaf springs 116 are no longer held outwardly and contacted by the enlargement 110. At this point, the normal bias of the leaf springs 116 snaps them inwardly toward the central axis of the hollow interior 34 moving the fingers 118 out of contact with the lip 136 and therefore out of the path of movement of the indicator 132. The compression spring 134 is now free to move the indicator 132 leftwardly in the direction of the port 38 until the indicator 132 is visually observable through the viewing port 130 and the transparent tube 126. Thus, an observer, such as a lineman, is provided with a visual indication that the pressure within the housing 12 has dropped below a point at which successful circuit interruption may be effected.

Should an overpressure condition occur, the bellows 56 expands, moving the cylindrical member 48 leftwardly toward the port 38 until the ends of the leaf springs 116 contact the shoulder 114, stopping further expansion of the bellows 36, Independently of the bellows action, the overpressure within the housing 12 acts on the rupturable diaphragm facility 40 in the manner described above. Subsequent to a pressure relief operation by the facility 40, the resultant loss of gas pressure in housing 12 permits the bellows 56 to contract and the low gas pressure visible indication results.

Thus, it should be clear from the above description that a combined pressure relief and pressure indicating mechanism 10 has been provided which is simple to construct, reliable and inexpensive. Specifically, overpressures within the housing 12 which exceed a first predetermined pressure, cause operation of the puncturing facility 90 to puncture the rupturable diaphragm 42, thereby relieving the pressure within the housing 12. Following this pressure relief, a visual indication of low pressure occurs. Similarly, underpressures which are less than a second predetermined pressure (which is less than the first predetermined pressure) cause inward movement of the cylindrical member 48 due to the spring rate of the bellows 56, ultimately yielding a visual indication thereof. Pressures within these two predetermined values define a "safe" range of pressures within the housing 12 and the pressure therewithin is neither vented nor is a visual indication of underpressure given.

The port 38 may be closed by an elastameric plug 138 which permits atmospheric pressure to be present within the hollow interior 34. This plug 138 is expelled outwardly following an over pressure relief as are the various parts which permits pressure relief. The plug 138 also prevents the entry of undesirable foreign matter into the bell housing 30. Moreover, if the plug 138 is absent and the visual indication that low gas pressure exists within the housing 12, there is signified to an observer that a pressure relief operation has occurred.

Various modifications and changes may be made to the pressure relief and pressure indicating mechanism of the present invention without departing from the scope thereof. For example, the viewing part 130 may be located to permit viewing of the indicator 132 only in its normal position when the housing pressure is normal.

What is claimed is:

1. A combined pressure relief and pressure indicating mechanism for a vented housing filled with fluid at super-atmospheric pressure, comprising:

rupturable diaphragm means for normally closing the vent;

means for normally maintaining the diaphragm means in a first configuration as long as the fluid pressure is below a first value and for permitting the diaphragm to move out of the first configuration into a second configuration when the fluid pressure exceeds the first value;

puncturing means for puncturing the diaphragm in response to movement of the diaphragm out of the first configuration and toward the second configuration;

a normally unobservable movable indicator biased to an observable position; and means, including the diaphragm means, for normally holding the indicator in the unobservable position as long as the fluid pressure is greater than a second value and for releasing the indicator for movement to the observable position in response to fluid pressure less than the second value, the second value being less than the first value.

2. A mechanism according to claim 1, wherein:

in the first configuration, the inside of the diaphragm means is convex and has applied thereto the fluid pressure, and the outside of the diaphragm means is concave and has applied thereto atmospheric pressure; and the puncturing means comprises
   a cutting section facing the inside of the diaphragm means, the cutting section being out of contact with the diaphragm in the first configuration thereof.

3. A mechanism according to claim 2, wherein in the second configuration the diaphragm means is everted so that its inside is concave and its outside is convex; and the cutting section contacts and punctures the diaphragm means as the diaphragm means everts.

4. A mechanism according to claim 3, which further comprises means connecting the puncturing means to the diaphragm means for relatively moving the cutting section into puncturing contact with the diaphragm means as the diaphragm means everts.

5. A mechanism according to claim 4, wherein the diaphragm means comprises an apertured frame movable relative to the vent;

a rupturable diaphragm normally closing the aperture; and bellows means surrounding the vent and the aperture and sealed between the housing and the frame for communicating the fluid pressure to the diaphragm, the bellows means permitting the frame to move away from the vent when the fluid pressure exceeds the second value, the spring rate of the bellows means moving the frame toward the vent when the fluid pressure is less than the second value; and the holding means comprises
  latch means responsive to a predetermined amount of frame movement toward the vent for releasing the indicator for movement to the observable position.

6. A mechanism according to claim 5, wherein:
the diaphragm means further comprises
  stop means for limiting the amount of movement of the frame away from the vent.

7. A mechanism according to claim 6, wherein:
the frame comprises
  a hollow cylindrical member axially movable toward and away from the vent, the bellows means being sealed to one end of the member, the diaphragm closing the aperture near the other end of the member, and
  an enlarged member on the outside of the cylindrical member; and
the latch means comprises
  an elongated leaf spring having a finger, the spring being biased so as to position the finger out of the path of the indicator, the enlarged member holding the finger in the path of the indicator as long as the cylindrical member does not move more than a predetermined amount toward the vent.

8. A mechanism according to claim 7, wherein
the stop means comprises
  a flange on the enlarged member defining a shoulder, the shoulder engaging an end of the elongated leaf spring to prevent more than a predetermined amount of movement of the cylindrical member away from the vent.

9. A mechanism according to claim 8, which further comprises:
  a housing for the mechanism having a viewing aperture therethrough;
  a first cylinder attached between the mechanism housing and the vented housing, and surrounding the diaphragm means, the maintaining means, the puncturing means and the holding means, the first cylinder having a passageway for movement therethrough of the finger;
  a second transparent cylinder surrounding the first cylinder, the first cylinder being normally viewable through the viewing aperture and the second cylinder; and wherein
the indicator comprises
  a cylindrical element between the cylinders movable axially thereof toward and away from the vent between a position whereat it is not visible through the viewing aperture and the second cylinder and a position whereat it is visible through the viewing aperture and the second cylinder, and
  a compression spring surrounding the first cylinder and acting between the cylindrical element and the vented housing.

10. A mechanism according to claim 9, wherein
the indicator further comprises
  a lip, against one side of which the compression spring acts, the other side of which is normally engagable by the finger.

11. A mechanism according to claim 1, wherein
in the second configuration the inside of the diaphragm means is concave and its outside is convex.

12. A mechanism according to claim 1, wherein
the diaphragm means comprises
  an apertured frame movable relative to the vent;
  a rupturable diaphragm normally closing the aperture; and
  bellows means surrounding the vent and the aperture and sealed between the housing and the frame for communicating the fluid pressure to the diaphragm, the bellows means permitting the frame to move away from the vent when the fluid pressure exceeds the second value, the spring rate of the bellows means moving the frame toward the vent when the fluid pressure is less than the second value; and
the holding means comprises
  latch means responsive to a predetermined amount of frame movement toward the vent for releasing the indicator for movement to the observable position.

13. A mechanism according to claim 12, wherein:
the diaphragm means further comprises
  stop means for limiting the amount of movement of the frame away from the vent.

14. A mechanism according to claim 13, wherein:
the frame comprises
  a hollow cylindrical member axially movable toward and away from the vent, the bellows means being sealed to one end of the member, the diaphragm closing the aperture near the other end of the member, and
  an enlarged member on the outside of the cylindrical member; and
the latch means comprises
  an elongated leaf spring having a finger, the spring being biased so as to position the finger out of the path of the indicator, the enlarged member holding the finger in the path of the indicator as long as the cylindrical member does not move more than a predetermined amount toward the vent.

15. A mechanism according to claim 14, wherein
the stop means comprises
  a flange on the enlarged member defining a shoulder, the shoulder engaging an end of the elongated leaf spring to prevent more than a predetermined amount of movement of the cylindrical member away from the vent.

16. A mechanism according to claim 1, which further comprises:
  a housing for the mechanism having a viewing aperture therethrough;
  a first cylinder attached between the mechanism housing and the vented housing, and surrounding the diaphragm means, the maintaining means, the puncturing means and the holding means, the first cylinder having a passageway for movement therethrough of the holding means;
  a second transparent cylinder surrounding the first cylinder, the first cylinder being normally viewable through the viewing aperture and the second cylinder; and wherein
the indicator comprises
  a cylindrical element between the cylinders movable axially thereof toward and away from the vent between a position whereat it is not visible through the viewing aperture and the second cylinder and a position whereat it is visible through the viewing aperture and the second cylinder, and
  a compression spring surrounding the first cylinder and acting between the cylindrical element and the vented housing.

17. A mechanism according to claim 16, wherein the indicator further comprises a lip, against one side of which the compression spring acts, the other side of which is normally engagable by the holding means.

18. A combined pressure relief and pressure indicating mechanism for a vented housing filled with fluid at super-atmospheric pressure, comprising:

rupturable diaphragm means for normally closing the vent, the diaphragm means being normally maintained in a first configuration as long as the fluid pressure is below a first value, and moving out of the first configuration into a second configuration when the fluid pressure exceeds the first value;

puncturing means for puncturing the diaphragm in response to movement of the diaphragm out of the first configuration and toward the second configuration; and a normally unobservable movable indicator biased to an observable position, the indicator being normally held by the diaphragm means in the unobservable position as long as the fluid pressure is greater than a second value and being released for movement to the observable position in response to fluid pressure less than the second value, the second value being less than the first value.

19. A combined indicator-relief mechanism for use with a dielectric-gas-pressurized high-voltage circuit interrupting device, the mechanism being of the type which automatically relieves an overpressure of the gas by venting the gas to atmosphere, and which gives an indication of an underpressure of the gas, the mechanism comprising:

an apertured frame movable relative to the device;

bellows means having a spring rate and interconnecting the frame to an opening in the interrupter and communicating the gas pressure to the aperture;

piercing means mounted for relative movement toward the diaphragm between the aperture and the opening;

means for normally deforming the diaphragm toward the opening and for preventing relative movement of the piercing means toward the diaphragm, an overpressure of the gas disabling the deforming means to evert the diaphragm and to relatively move the piercing means against the diaphragm so that upon piercing thereof, the gas is vented to the atmosphere;

a normally unobservable indicator;

means for biasing the indicator toward a visually observable position; and means for normally maintaining the indicator in the unobservable position against the action of the biasing means and for releasing the indicator to the action of the biasing means in response to movement of the frame caused by movement of the bellows incident to an underpressure of the gas.

20. A combined pressure relief and pressure indicating mechanism for a vented housing containing a fluid, comprising diaphragm means for normally closing the vent;

means for puncturing the diaphragm means to relieve an excessive overpressure in the housing; and a movable indicator biased toward a first position, the indicator being normally held by the diaphragm means in a second position as long as fluid pressure exceeds a predetermined minimum, the indicator being released for movement to the first position if the fluid pressure is less than the minimum.

* * * * *